(12) United States Patent
Hwang et al.

(10) Patent No.: US 6,599,995 B2
(45) Date of Patent: Jul. 29, 2003

(54) POLYALKYLAROMATICSILSESQUIOXANE AND PREPARATION METHOD THEREOF

(75) Inventors: Seung-Sang Hwang, Seoul (KR); Soon-Man Hong, Seoul (KR); Eung-Chan Lee, Incheon (KR); Seung-Pyo Hong, Seoul (KR)

(73) Assignee: Korea Institute of Science and Technology, Sungbook-ku (KR)

( * ) Notice: Subject to any disclaimer, the term of this patent is extended or adjusted under 35 U.S.C. 154(b) by 0 days.

(21) Appl. No.: 09/845,246

(22) Filed: May 1, 2001

(65) Prior Publication Data

US 2002/0169269 A1 Nov. 14, 2002

(51) Int. Cl.$^7$ .......................... C08G 77/04; C08G 77/06
(52) U.S. Cl. .......................... 525/474; 528/14; 528/21; 528/33; 528/43
(58) Field of Search .......................... 528/14, 21, 33, 528/43; 525/474

(56) References Cited

U.S. PATENT DOCUMENTS

| | | | | | |
|---|---|---|---|---|---|
| 5,030,699 | A | * | 7/1991 | Motoyama et al. | ......... 524/284 |
| 5,158,854 | A | * | 10/1992 | Imamura et al. | ............ 430/165 |
| 5,179,185 | A | * | 1/1993 | Yamamoto et al. | ........... 528/32 |
| 5,180,691 | A | * | 1/1993 | Adachi et al. | ................ 438/127 |
| 5,236,984 | A | * | 8/1993 | Yamamoto et al. | ......... 524/233 |
| 5,491,203 | A | * | 2/1996 | Matsui et al. | ................ 525/474 |
| 6,251,486 | B1 | * | 6/2001 | Chandross et al. | ......... 427/387 |

OTHER PUBLICATIONS

Eung–Chan Lee and Yoshiharu Kimura, A New Formation Process of Poly(Phenylsilsesquioxane) in the Hydrolytic Polycondensation of Trichlorophenylsilane. Isolation of Low Molecular Weight Hydrolysates to Form High Molecular Weight Polymers at Mild Reaction Conditions, Polymer Journal, vol. 29, No. 8 pp 678–684 (1997).

Toshio Takiguchi, Preparation of Some Organosilanediols and Phenylsilanetriol By Direct Hydrolysis Using Aniline as Hydrogen Chloride Acceptor, Journal of American Chemical Society, vol. 81, pp. 2359–2361, May 20, 1959.

Leslie J. Tyler, Phenylsilanetriol, Journal of American Chemical Society, vol. 77, pp 770–771, Feb. 5, 1955.

Douglas A. Loy, et al., Substituent Effects on the Sol–Gel Chemistry of Organotrialkoxysilanes, Chem. Mater. 2000, 12, 3624–3632.

John F. Brown, Jr., et al., Double Chain Polymers of Phenylsilsesquioxane, Communications to the Editor, vol. 82. 6194–6195.

* cited by examiner

*Primary Examiner*—Robert Dawson
*Assistant Examiner*—Jeffrey B. Robertson
(74) *Attorney, Agent, or Firm*—Lowe Hauptman Gilman & Berner, LLP

(57) ABSTRACT

The present invention relates to a highly regular and well-defined ladder structured polyorganosilsesquioxane with superior heat resistance, combustion resistance and flexibility. This product is made by alternatingly bonding together two kinds of substituents. The polyorganosilsesquioxane prepared according to the present invention has a small molecular weight distribution and a high molecular weight. It is soluble in organic solvents because its three-dimensional network structure is not formed as a result of a condensation polymerization, which resulted in a product having structure defect(s) and randomness because of the oligomer that was previously used as a starting material for polymerization. Polyalkylaromaticsilsesquioxanes obtained according to the preparing method of the present invention are useful, heat-resistant materials. They can be used as a heat-resistant coating agent, an agent for protecting optical fiber, a coating material for a resistor, heat-resistant paint, adhesive and releasing agent for precise molding. These ladder polymers can be used for a protective layer for semiconductors, interlayer dielectrics for semiconductor integration (e.g. LSI), resist material and as a new heat-resistant photoresist.

10 Claims, No Drawings

POLYALKYLAROMATICSILSESQUIOXANE AND PREPARATION METHOD THEREOF

BACKGROUND OF THE INVENTION

FIELD OF THE INVENTION

The present invention relates to polyorganosilsesquixanes with superior heat resistance, combustion resistance and flexibility, expressed by the following formula (1) having a highly regular ladder structure wherein two kinds of substituents are bonded alternately, and a preparation method thereof,

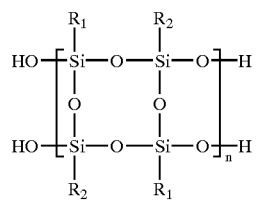

(1)

wherein $R_1$ and $R_2$ represent a hydrogen atom, a lower alkyl group such as methyl, ethyl and propyl, an aromatic compound like phenyl, halogenated phenyl group ($C_6H_5Cl$, $C_6H_5RCl$), an allyl group or a cyclo-compound; and wherein n represents an integer that is sufficiently high that said polyalkylaromaticsilsesquioxanes (1) is a solid at up to 110° C.

A conventional polyorganosilsesquioxane was obtained by performing condensation polymerization of an oligomer by heating, which was obtained by hydrolyzing trichlorosilane or triethoxysilane in the presence of alkaline catalyst in highly viscous solvents like NMP, DMSO and MIBK [Brown et al., *J. Am. Chem. Soc.*, 82, 6194 (1960)]. By this hydrolysis method, oligomers (Mn=1000–3000, Mw/Mn>2) other than a precursor (silantriol) tend to be formed because a condensation occurs concurrently with a hydrolysis. And, a polymer obtained from this oligomer in the presence of alkaline catalyst has problems in that:

a. It usually has a large molecular weight distribution and low molecular weight (Mn below 20,000–30,000); and b. It is insoluble in an organic solvent because a 3-dimensional network structure is formed during the condensation polymerization due to the defect and randomness of an oligomer structure.

Also, using this polymerization method it is almost impossible to control the molecular weight of polymers.

Another method of preparing a silicon ladder polymer using phenylsilantriol [L. J. Tyler et al., *J. Am. Chem. Soc.*, 77, 770 (1955), T. Takiguchi et al., *J. Am. Chem. Soc.*, 81, 2359 (1959), E. C. Lee et al., *Polymer Journal*, 29(8), 678 (1997)] enables a preparation of a highly regular polymer with 1,000–1,000,000 of average number molecular weight (Mn) and lower than 2 of molecular weight distribution (Mw/Mn). However, the preparation process becomes complicated to obtain silantriol in high purity and the treatment of phenylsilantriol is very difficult. Especially, the yield is very low (lower than 10–20%), so that it is not economical.

SUMMARY OF THE INVENTION

In order to solve these problems, the present invention aims at designing a molecular model wherein R,R'—$SiO_{3/2}$ can be regularly introduced into a main chain of a polymer in a simple way and a condensation method thereof.

DETAILED DESCRIPTION OF THE INVENTION

The present invention uses 1,3-organodisiloxane expressed by formula (2) for the purpose of controlling a structure of a silicone ladder polymer,

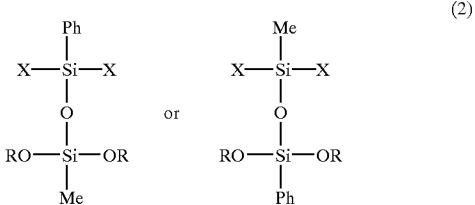

(2)

wherein X represents a hydrogen atom, Cl, OH, $NH_2$ or COOH; and R represents a hydrogen atom, an alkyl group, an acetate group or a metal like Na and K.

In the present invention, 1,3-organodisiloxane is soluble in general organic solvents and the prepared polymer is also soluble in general organic solvent like aromatic hydrocarbons such as toluene, xylene, benzene and chlorobenzene; halogen hydrocarbons such as methlyene chloride, chloroform, dichloroethylene, trichloroethylene and trichloroethane; ethers such as THF, 1,4-dioxane, diethyl ether and dibutyl ether; ketones such as acetone, methyl ethyl ketone and methyl ether ketone; esters such as butyl acetate, ethyl acetate, ethyl acetate and methyl acetate; and dimethylformamide.

A concentration of 1,3-organodisiloxane is recommended to be in the range of 30–80 wt. %. Under the concentration below 30 wt. %, the condensation reaction is slow or insufficient; and under the concentration over 80 wt. % there is a tendency of gel formation.

Any catalyst may be selected to facilitate the condensation reaction of 1,3-organodisiloxane. However, alkaline metal hydroxides like NaOH, KOH and CsOH; amines like triethylamine, diethylene triamine, m-butylamine, p-dimethylamine ethanol and triethanolamine; quaternary ammonium salts; or fluorides are recommended. A concentration of the condensation catalyst is recommended to be 0.01–20 wt. % to 1,3-organodisiloxane.

In the present invention, the condensation reaction can be carried out by heating 1,3-organodisiloxane solution. A preferred reaction temperature is 50° C.–350° C., more preferably 100–150° C.

A reaction time is 6–50 hr in case catalyst is used. If no catalyst is used, the reaction should be carried out for a long time at a high temperature.

If the 1,3-organodisiloxane is above 90% in purity, sufficiently high-molecular-weight polymer can be obtained by this method.

Hereunder is given a detailed description of the preparing method. However, it should not be construed as limiting the scope of the present invention.

PREPARING EXAMPLE 1

A 50 mL round-bottomed flask connected to a dropping funnel and equipped with a magnetic stirrer was flame-dried under nitrogen flow. After placing 20 mL of toluene into the flask equipped with a reflux condenser, it was heated to 110° C. The reaction was carried out by adding 7.8 g of 1,1,1-dichlorophenyl-3,3,3-dimethoxymethyldisiloxane [PhCl$_2$Si—O—Si—Me(OMe)$_2$] at a rate of 1 drop/min under nitrogen flow. After dropping was completed, the reaction temperature was raised to 120° C., and the reaction was resumed for 24 hr.

After adding 10 mL of tertiary distilled water and stirring the reaction mixture for 3 hr, the reaction was terminated. After dropping the reaction mixture solution in excess methanol, stirring for 1–2 hr and filtering the precipitate, the product was obtained as a white powder (yield: 92%, 7.18 g). Analysis was performed after drying the product under the vacuum for 10 hr at 110° C.

The average number molecular weight (Mn) and the moecular weight distribution (Mw/Mn) of the prepared polymer was 12,000 and 1.38, respectively.

The structure of the prepared polymer was analyzed with $^1$H NMR and IR.

$^1$H NMR analysis showed the Si—CH$_3$ chemical shift at 0.15 ppm, Si—OH chemical shift at 1.5 ppm and Si—Ph chemical shift at 7.1–7.6 ppm. In particular, the integral ratio of CH$_3$/Ph was 31.12:53.57, which is close to the theoretical value of 3:5.

Also, IR analysis showed the asymmetric stretching vibration of the siloxane bond (Si—O—Si) (theoretical values: 1040 & 1140 cm$^{-1}$), characteristic of the silicone ladder polymer, as a double peak at 1035.5 and 1137.9 cm$^{-1}$.

With these, the structure of the polymer of the present invention was identified as the formula (1).

PREPARING EXAMPLE 2

The experiment apparatus was set identically as in Preparing Example 1.

After placing 10 mL of DMSO in a 50 mL round-bottomed flask equipped with a reflux condenser, it was heated to 110° C. After transferring 5 g of separately prepared 1,1,1-dichloromethyl-3,3,3-phenyldisodiumelate disiloxane [MeCl$_2$Si—O—SiPh(ONa)$_2$] dissolved in DMSO to a dropping funnel under nitrogen flow, the reaction was proceeded by dropping the prepared solution slowly (1 drop per 3 min) while stirring vigorously. After dropping was completed, the reaction temperature was raised to 120° C., and the reaction was resumed for 24 hr.

After adding 10 mL of tertiary distilled water, bubbling with dry CO$_2$ gas and stirring the reaction mixture for 3 hr, the reaction was terminated. After dropping the reaction mixture solution in excess methanol, stirring for about 2 hr and filtering the precipitate, the product was obtained as a white powder (yield: 90.8%, 4.54 g). Analysis was performed after drying the product in vacuum for 10 hr at 110° C.

The average number molecular weight (Mn) and the molecular weight distribution (Mw/Mn) of the prepared polymer was 48,000 and 1.51, respectively. The molecular weight distribution was lower than 2.

The structure of the prepared polymer was identical as in Preparing Example 1.

PREPARING EXAMPLE 3

A 100 mL 1-neck round-bottomed flask and a 500 mL 3-neck round-bottomed flask connected to a dropping funnel and equipped with a magnetic stirrer were flame-dried under dry nitrogen flow. After dissolving 10 g of 1,1,1-dichlorophenyl-3,3,3-dimethoxymethyldisiloxane [PhCl$_2$Si—O—Si—Me(OMe)$_2$] in 80 mL of toluene in a separate 100 mL flask, the reaction mixture was stirred until the temperature reached 3° C. and then transferred to a dropping funnel. After placing 310 mL of distilled water and ice in the 500 mL 3-neck round bottom flask, the hydrolysis was performed by dropping the mixture solution slowly (1 drop per 1 sec) while stirring vigorously. After stirring another 20–30 min after the dropping was finished, the hydrolysis was completed. The reaction solution was separated as a water layer and a toluene layer in a separation funnel. 70 wt. % of cooled sodium bicarbonate solution was dropped through a dropping funnel in order to neutralize hydrochloric acid produced in the water layer to pH 7. After precipitating the hydrolysate in the water layer with thawing method and filtering the filtrate, 9.4 g of the hydrolysate [Ph(OH)$_2$Si—O—SiMe(OMe)$_2$] (cf. FIG. 5) (yield: 94 wt %) was obtained.

After dissolving 9.4 g of the hydrolysate in 10 mL of toluene in a 50 mL round bottom flask equipped with the Dean-Stark tube, the axial polymerization was performed for 16 hr at 120° C. in the presence of 0.94 mg (0.01 wt %) of KOH catalyst. After dropping the reaction solution in excess methanol, stirring for about 30 min and filtering the precipitate, the product was obtained as a white powder (yield: 95.7%, 9 g). Analysis was performed after drying the product in vacuum for 10 hr at 110° C.

The average number molecular weight (Mn) and the molecular weight distribution (Mw/Mn) of the prepared polymer was 78,000 and 1.32, respectively.

The structure of the prepared polymer was identical as in Preparing Example 1.

Polyalkylaromaticsilsesquioxanes obtained from the preparing method of the present invention is useful for heat-resistant material. Thus, it can be used for heat-resistant coating agent, protective coating agent of optical fiber, coating material for resistor, heat-resistant paint, adhesive and releasing agent for precise molding. Also, it can be used for the semiconductor protective layer, interlayer dielectrics for semiconductor integration (e.g. LSI), resist material and new heat-resistant photoresist.

What is claimed is:

1. A substantially perfect ladder structure polyalkylaromaticsilsesquioxane polymer expressed by the following formula (1),

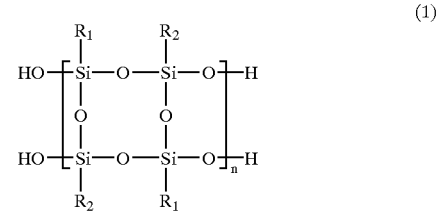

wherein R$_1$ and R$_2$ each represent at least one moiety selected from the group consisting of a hydrogen atom, a lower alkyl group, an aromatic group, an allyl group and a cycloaliphatic compound; and wherein n is an integer that is sufficiently high that said polyalkylaromaticsilsesquioxane (1) is a solid at up to about 110° C.

2. A method of preparing a polyalkylaromaticsilsesquioxanes ladder polymer which is a solid at up to about 110° C., which method comprises condensing at least one 1,3-organodisiloxane expressed by the following formula (2),

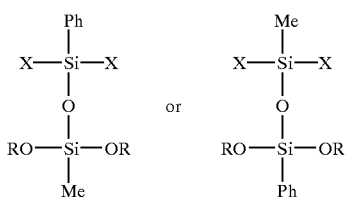

(2)

wherein X represents at least one member of the group consisting of hydrogen atom, Cl, OH, NH$_2$ and COON; and R represents at least one member selected from the group consisting of hydrogen atom, an alkyl group, an acetate group and a metal.

3. The method of preparing a polyalkylaromaticsilsesquioxane ladder polymer according to claim 2, wherein the condensation reaction is performed in the presence of at least one catalyst selected from the group consisting of an alkali metal hydroxide; an amine; a quaternary ammonium salt; and a fluoride compound.

4. The method of preparing a polyalkylaromaticsilsesquioxane ladder polymer according to claim 3, wherein said catalyst is used in the range of about 0.01–20 wt. % to the 1,3-organodisiloxane.

5. The polyalkylaromaticsilsesquioxane as claimed in claim 1 wherein said aromatic compound is at least one member selected from the group consisting of phenyl and halogenated phenyl.

6. The polyalkylaromaticsilsesquioxane as claimed in claim 1 wherein said lower alkyl group is at least one member selected from the group consisting of methyl, ethyl and propyl.

7. The method as claimed in claim 2 wherein said metal is at least one selected from the group consisting of sodium and potassium.

8. The method as claimed in claim 2 wherein said condensation reaction is accomplished without catalyst.

9. The method as claimed in claim 3 wherein said alkali metal hydroxide is at least one member selected from the group consisting of sodium hydroxide, potassium hydroxide and cesium hydroxide.

10. The method as claimed in claim 3 wherein said amine is at least one member selected from the group consisting of triethyl amine, diethylene triamine, n-butyl amine, p-dimethyl aminoethanol, and triethanol amine.

* * * * *